Aug. 19, 1941.  E. S. CORNELL, JR  2,253,110
SELF-COMPENSATING BEARING
Filed Nov. 19, 1937

INVENTOR
Edward S. Cornell, Jr.
BY
HIS ATTORNEY

Patented Aug. 19, 1941

2,253,110

UNITED STATES PATENT OFFICE 2,253,110

SELF-COMPENSATING BEARING

Edward S. Cornell, Jr., Larchmont, N. Y.

Application November 19, 1937, Serial No. 175,409

2 Claims. (Cl. 308—69)

My present invention is directed to improved bearings for air motors or the like.

An objective of the present invention resides in providing a bearing which is self-compensating under the circumstance of wear of the relatively moving parts.

A further objective is the provision of housing means enclosing such self-compensating bearing, and preferably arranged to embody a supply of lubricant for the moving parts effective over a relatively long period of operation.

The invention possesses marked advantages in the commercial operation of motor-fan assemblies, where minimum attention and minimum interruption of operation are of moment.

These advantages are particularly valuable in the operation of the air-motor-fan assemblies of my thermal system set forth generally and claimed in my U. S. Patent No. 2,038,347, granted April 21, 1936, entitled Air conditioned heating and cooling system.

Usually, in the above referred to air-motor-fan assemblies, the shaft, supported in bearings incorporating my present invention, serves as the common shaft for the mounting of the rotor of such air motor and for the fan or other driven part.

Structurally, embodiments of my invention comprise a housing through which the shaft extends, at each end of which is a thrust bearing, comprising a perforated ring, provided at its thrust bearing face with a concave face mating with and receiving a roller bearing. Such roller bearing is centrally perforated to freely receive the shaft, and between such roller bearings are provided symmetrically located masses of felt, associated with spring retaining cups and an expansile spring retained by such cups. In such forms of the invention the lubricant may be supplied to the felt masses; to provide for greater period of lubrication, for a given quantity of lubricant, the bearing housing is recessed to receive a "cartridge," i. e. a cylindrical mass of felt, which may extend for the major length of the bearing and adapted to contain a relatively large amount of lubricant.

The thrust bearing ring at the end of the housing is preferably positioned by drive fit, thus simplifying the assembly and completion of the bearing parts.

Further features and objects of the invention will be more fully understood from the following detail description and the accompanying drawing, in which Fig. 1 is a central vertical section of an air motor and fan assembly, the common shaft of the rotor and fan being mounted in a bearing embodying my present invention;

Figure 1:
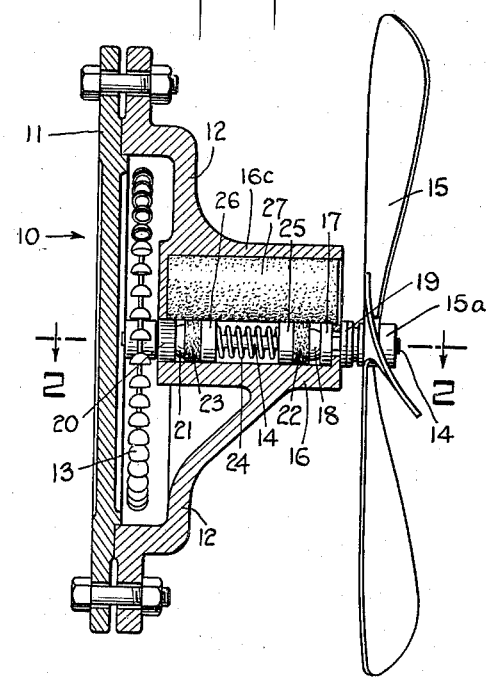
Figure 2:
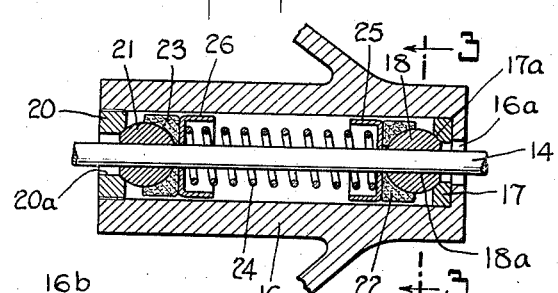
Fig. 2 is a detail transverse section on line 2—2 of Fig. 1.
Figure 3:
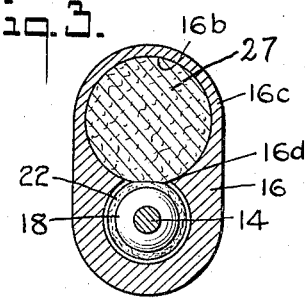
Fig. 3 is a detail sectional view taken on the line 3—3 of Fig. 2.

Whereas, the embodiment of my invention illustrated in the drawing, is exemplified by application to an air-motor-fan assembly, it is understood that the principles of my invention are applicable to bearings generally for a shaft, in which self-compensation is provided for the wearing parts, and utilization of a given amount of lubricant is effected for maximum total period of operation.

In the exemplification illustrated in the drawing, the air motor is indicated generally at 10, its casing being shown as formed of a base plate 11 and rotor housing plate 12. The rotor is indicated at 13. Such air motor is provided with a suitable nozzle (not shown), correlated with the buckets of the rotor 13, and an opening (not shown) in the motor housing serving for the discharge of the air from the interior of the motor housing. Desirable types of nozzle, rotor assembly and discharge opening for air motors are set forth in particulars in my United States Patents Nos. 1,977,820, 1,977,821 and 2,013,087.

In such assembly, the shaft 14 serves as the common shaft of the rotor 13 and the fan 15.

The housing 16 for enclosing the bearing, is advantageously formed, as shown, as an extension of the rotor housing plate 12.

Pursuant to my present invention, the bearing comprises a thrust bearing ring 17, the face 17a of which is arcuately ground or otherwise formed to matingly receive the spherical or other suitable arcuately contoured face of a ball bearing 18. The ball bearing 18 is centrally perforated, as is indicated at 18a, to slidingly receive the shaft 14. The stated thrust bearing assembly of bearing ring 17 and ball bearing 18, thus described, are shown located at the fan end of the bearing housing 16, at which end the bearing housing is provided with an opening 16a through which the shaft 14 projects.

One or more washers 19 may be placed about the shaft 14 at and surrounding the opening 16a of the housing 16, serving dually as a bushing for the hub 15a of the fan and to effectively close the opening 16a about the shaft 14. The hub 15a is secured to the shaft by any suitable means.

At the opposite or rotor end of the housing, similar means are provided, viz. a thrust bearing ring 20, whose bearing face 20a, receives a ball bearing 21, which is centrally perforated to freely receive the shaft 14. The bearing ring 20 is preferably positioned at the rotor end of the housing by drive fit.

Intermediate the ball bearings 18 and 21, there is a mass of felt or the like 22, engaging the ball bearing 18 and a mass of felt or the like 23 engaging the ball bearing 21, and respectively urged into such engagement by the expansile spring 24, the opposite ends of which are preferably received in the cups 25, 26, respectively engaging the masses 22, 23.

Assembled, as thus described, lubricant supplied to the masses 22, 23, effectively lubricates all interengaging relatively moving parts, the substantial enclosure of the interior of the bearing housing conserving the supplied quantity of the lubricant.

In the circumstance of wear of the relatively moving parts, including wear of the thrust faces, 17a, 20a, the expansile spring 24 maintains due engagement of the bearing balls 18, 21, with the respective thrust faces 17a, 20a.

To provide for greater period of lubrication, for a given quantity of lubricant a "cartridge" 27, of felt or the like is located in recess 16b, formed in an extension 16c of the housing proper 16, the recess 16b communicating, see 16d, with the interior of the housing proper 16, thus affording direct contact of such "cartridge" 27 with the respective masses 22, 23.

In analogous manner, my self-compensating bearing assembly, is applicable for shafts of other types of driving and driven parts.

Whereas, I have described my invention by reference to specific forms thereof, it will be understood that many changes and modifications may be made without departing from the spirit of the invention.

I claim:

1. A self-compensating bearing and shaft assembly, comprising in combination, a shaft, oppositely positioned ball members, said ball members having perforations through which said shaft projects and is rotatively supported, thrust bearing members respectively engaged by said ball members, resilient means passing about said shaft and urging said ball members respectively toward their respective said thrust bearing members in opposing directions substantially parallel to the axis of said shaft, and mutually spaced lubricant feeding elements respectively for said ball members and positioned about said shaft and between said resilient means and said ball members respectively.

2. A self-compensating bearing, housing and shaft assembly, comprising in combination, a housing having a cylindrically contoured interior portion and a longitudinally disposed recessed portion communicating with said cylindrically contoured interior portion, said recessed portion serving to receive and feed lubricant, a shaft extending into said cylindrically contoured interior portion, ball members having perforations through which said shaft extends and is rotatively supported, thrust bearing members respectively engaged by said ball members, said thrust bearing members being positioned at opposing locations in said cylindrically contoured interior portion of the housing, expansile coil spring means passing about said shaft and urging said ball members respectively toward their respective said thrust bearing members in opposing directions substantially parallel to the axis of said shaft, and mutually spaced lubricant feeding elements respectively for said ball members and positioned about said shaft and between said resilient means and said ball members respectively, said lubricant feeding elements being respectively disposed in lubricant-receiving cooperation with said longitudinally arranged recess.

EDWARD S. CORNELL, Jr.